July 14, 1959  R. H. WHITE ET AL  2,894,791
CAGED ROLLER BEARING ASSEMBLY
Filed Oct. 10, 1956  3 Sheets-Sheet 1

INVENTORS
R. H. WHITE
J. H. COWLES
S. F. CLARK
BY Mason, Porter, Miller & Stewart
ATTORNEYS July 14, 1959  R. H. WHITE ET AL  2,894,791
CAGED ROLLER BEARING ASSEMBLY
Filed Oct. 10, 1956  3 Sheets-Sheet 3

INVENTORS
R. H. WHITE
J. H. COWLES
S. F. CLARK

BY Mason, Porter, Miller & Stewart

ATTORNEYS

United States Patent Office 2,894,791
Patented July 14, 1959

2,894,791

CAGED ROLLER BEARING ASSEMBLY

Robert H. White, Torrington, John H. Cowles, Forestville, and Sidney F. Clark, Torrington, Conn., assignors to The Torrington Company, Torrington, Conn., a corporation of Maine Application October 10, 1956, Serial No. 615,191

11 Claims. (Cl. 308—212)

The specification which follows relates to improvements in caged roller bearing assemblies and the cages thereof.

In the present state of roller bearing art, roller bearings are made with various means of roller spacing, guiding, positioning, retention, and roller assembly mechanisms or devices. The design of roller bearing that this specification relates to is one which can be used where one or more of the race elements is part of the equipment to which the bearing is applied or one which has the rollers between two separate race elements. This particular design then satisfies the requirement of a design where a single race type of caged roller bearing is used and the retainer or cage must serve the following functions, namely: space the rollers; retain the rollers during shipment or servicing; guide the rollers in substantially parallel relationship with the bearing axis; provide a practical method of roller assembly; provide controlled wear areas so that the life of the bearing is not limited by premature wearing in some area; and of such design as to allow adequate lubricant supply to all bearing elements.

The cages are retainers in the present state of art theoretically may have some of the functions listed above but in practice are subject to loss of the theoretical benefits due to manufacturing tolerances.

The improvements or simplification in design of caged roller bearing assemblies to be brought forth in this specification is obtained by designing the cage and race of the bearing to incorporate all the functions listed above, but in a manner which is practical to manufacture. This will be described below.

The practicality of the cage or retainer of this specifiation lies in the fact that the slots or openings in the grid are rectangular in shape, with no projections into the slot at the piercing operation. This makes a simplified slot to manufacture. Dies and punches are simple and can be made to line up readily. The substantially parallel bars have uniform cross section throughout their length. No projections are pierced, coined or staked into the bars for any purpose.

Retention of the rollers radially is dependent only on the geometric relation that after the slotting operation in one circumferential plane a radial movement of the bars to a new circumferential plane changes the circumferential length in this second plane. The bars being uniform in width take up the same part of the second circumference as in the first circumferential plane; therefore, the difference in the two circumferences is reflected into the slot openings. The lower circumferential plane slot openings, then, are designed to be less than a roller diameter and the upper or diameter circumferential planes have slot openings progressively larger, depending upon the same geometric relations.

The level or circumferential area in which the ends of the bars lie parallel to the lower circumferential area is the area of roller guiding and spacing, and occurs substantially at the chord between the centers of adjacent rollers. Novelty and practicality of the retainer design is reflected at this point also.

By way of example and as illustrating the preferred form of this invention, it has been illustrated on the attached drawings, in which.

Briefly described the novel caged roller bearing assembly includes an improved cage for the individual rollers so designed that the latter will be guided at their ends rather than centrally and that the cage will be supported freely and independently of the rollers. By means of the improved design, the cage may be assembled within the outer race or cup and the rollers inserted as a final step. The three elements will then be held together without other retaining means. This results from the design of the individual bars which in their center or depressed portions limit the rollers in their movement toward the center of the bearing.

Figure 1:
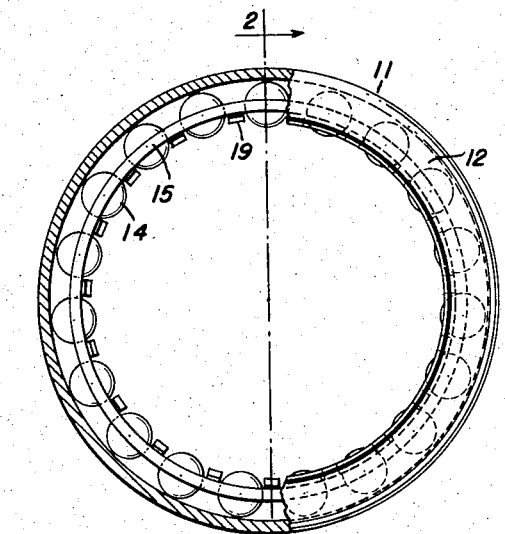
Fig. 1 is a side elevation partly in section of one form of the improved bearing assembly.
Figure 2:
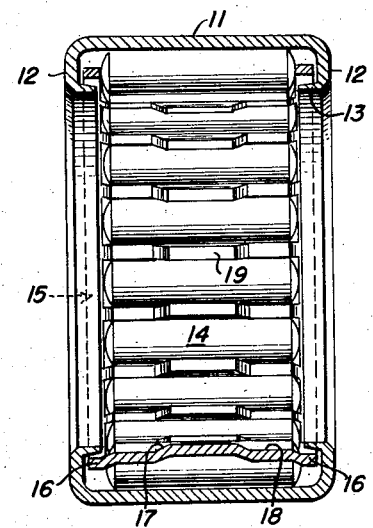
Fig. 2 is a vertical transverse section on the line 2—2 of Fig. 1.

In the form of the invention as illustrated in Figs. 1 and 2, an outer race or cup 11 is provided. This is made of appropriate material which may be hardened after forming. The cup has radial ends 12. These ends have flanges 13 which are bent inwardly.

The ends 12 with their flanges 13 form a chamber for the retention of lubricants.

In addition the ends 12 serve to limit the cage against end movement.

The rollers are shown at 14. These rollers are generally cylindrical and have slightly convex ends. These ends are within the flanges 13, but may not bear against the latter.

It is not necessary for the ends of rollers 14 to be definitely rounded or formed with trunnions.

The rollers 14 are held in place by means of a cage 15 which is previously assembled with the race 11. The cage 15 is in the form of a substantially tubular grid. This grid includes circular ends 16. The ends 16 are connected by narrow, resilient bars 17 which combine with the ends 16 to form the grid. The bars are spaced apart to provide adequate free clearance for the adjacent rollers 14.

In Fig. 2, the bars 17 have been shown to be offset in two steps. The first offset 18 is such that it guides the ends of the rollers.

The center 19 of each bar 17 is further depressed to within a short distance of the inside diameter subtending the series of rollers, as shown in Figs. 1 and 2.

The bearing is assembled by inserting the cage within the outer cup or race before one end 12 and flange 13 is formed. By bending the end 12 and flange 13 into place, the cage is confined within the cup of the race. The two elements may then be heat treated together if desired.

Finally the individual rollers are inserted between adjacent resilient bars 17 by an outward pressure exerted on the rollers 14.

Figure 3:
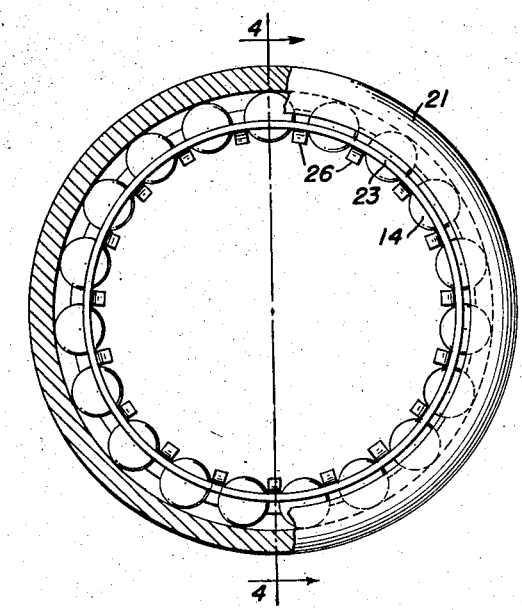
Fig. 3 is a side elevation partly in section of a modified form of the assembly.
Figure 4:
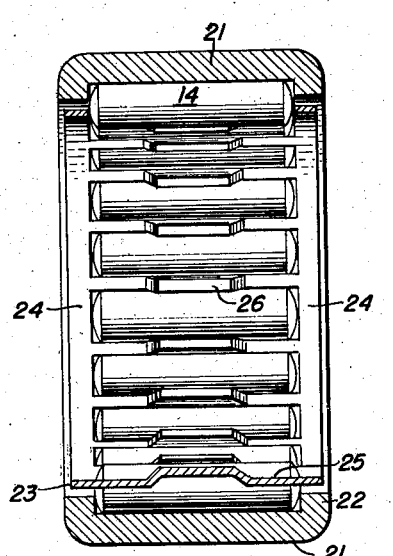
Fig. 4 is a vertical transverse section on the line 4—4 of Fig. 3.

A modification of the invention is illustrated in Figs. 3 and 4. Here the outer cup or race 21 is made with inwardly extending ends 22. The ends 22, however, do not extend beyond the axes of the cylindrical rollers 14. It will be seen that the distance between the inner edges of the ends 22 is substantially the same as the length of the rollers which are free to move endwise within the intervening space.

The cage 23 is also a cylindrical grid, having circular ends 24, 24. These ends are connected by bars 25 and are at the same level as the guiding portions of bars 25.

The center 26 of each bar 25 is dropped or depressed. The extent of this depression is substantially the inner diameter of the roller assembly. In this way the centers 26 will support the cage 23 on the inner shaft and retain rollers when shaft is not present.

The cage is also resilient in this instance. The mode of assembly consists first in placing the cage 23 within the outer cup 21 and then springing the centers 26 apart with the roller 14 as that roller is inserted. The centers 26 spring back into normal position after passage of the roller leaving a space less than the diameter of the confined roller.

The cage may be formed either from tubular material or it may be formed from flat material. Thus in Fig. 9, the grid 27 is formed from flat material. The ends are brought into abutting position and the cage then held together in substantially cylindrical form by the use of small end collars 28, 28. These collars fit around the ends of the grid 27, reinforcing the same and holding the grid in cylindrical shape.

It will be noted that the grid in this instance is formed with connecting bars 17 having two offset portions 29, 29 and a center depressed portion 30. This mode of construction as illustrated may be used in the bearing illustrated in Fig. 2.

Figure 7:
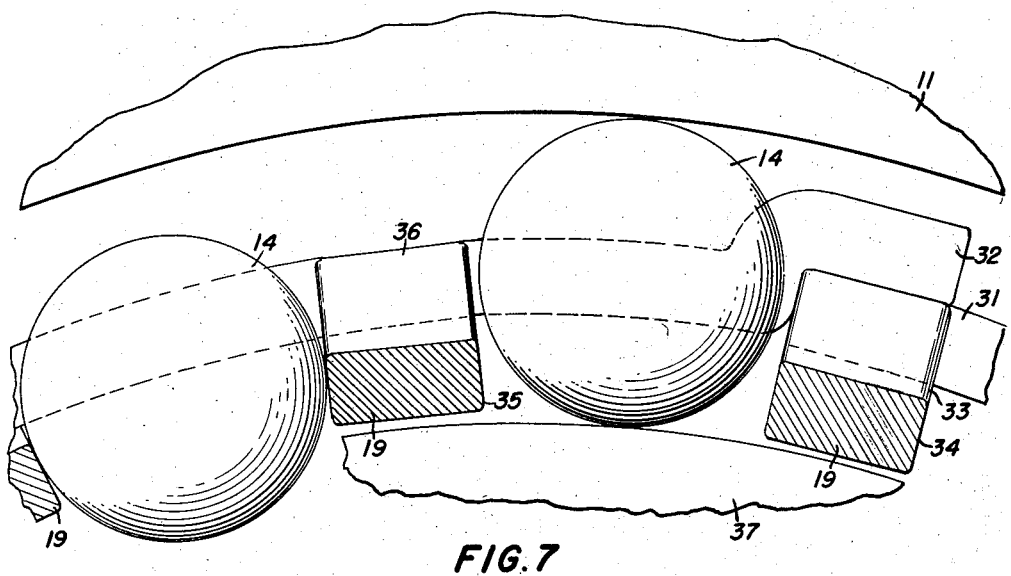
Fig. 7 is a similar view of a modified form of cage shown in Fig. 5.
Figure 8:
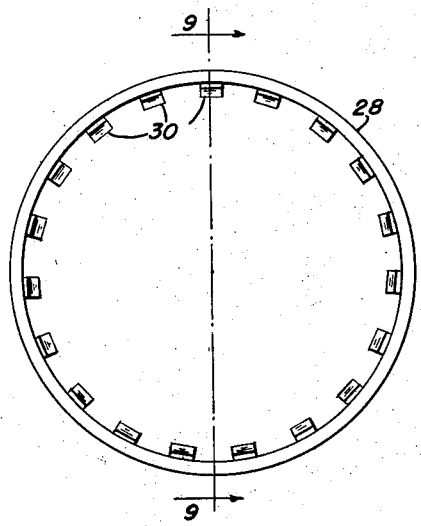
Fig. 8 is a side elevation of another modification of cage construction.
Figure 9:
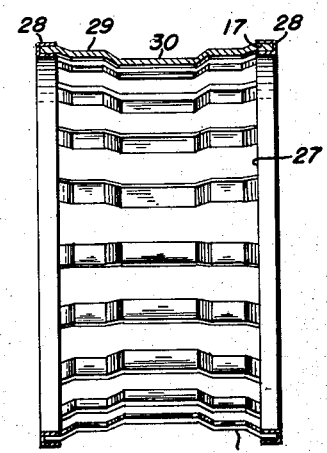
Fig. 9 is a vertical transverse section on the line 9—9 of Fig. 8.

Instead of bringing the ends of the cage into abutting relation as in the case of Fig. 9, these ends may be overlapped and welded. Such an arrangement is shown in Fig. 7 where one end 32 overlays the opposite end 31 to which it is welded. In this arrangement the end 31 has a cross bar 33, the center portion 34 of which is depressed in the same manner as the other cage bars 36 which makes the cage function in the same manner as the previously described constructions.

Figure 5:
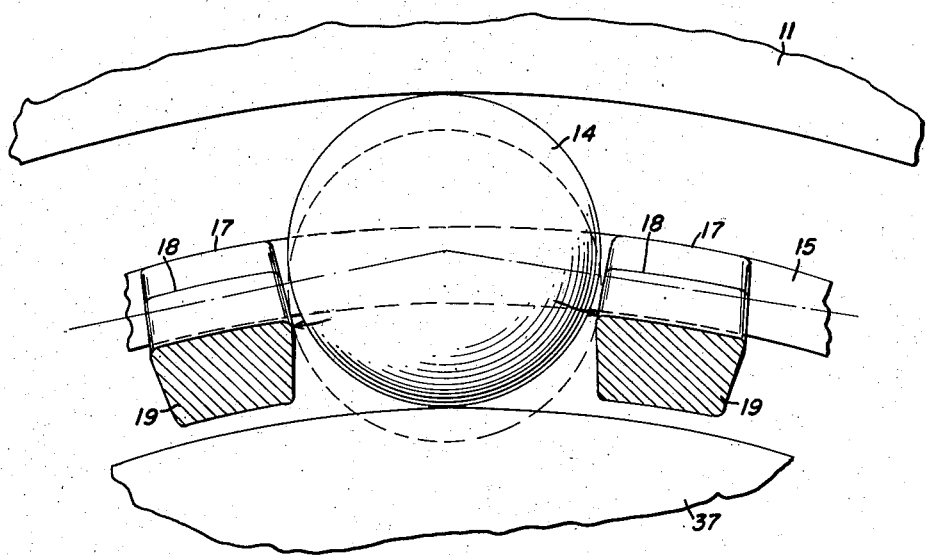
Fig. 5 is an enlarged diagrammatic view partly in section showing the retention of the roller in the cage.

Fig. 5 illustrates the arrangement by which the depressed centers of the bars serve to satisfactorily retain the rollers in place after they have been inserted. The cage is illustrated as being between a shaft 37 and an outer race 11. The roller 14 normally occupies the entire distance between the shaft and the outer race.

The depressed centers 19, 19 hold the rollers from dropping downwardly between adjacent bars as shown by the dotted lines on Fig. 5 when the shaft is removed.

The retainment of the rollers is accomplished due to the bars subtending a larger arc at the center section effecting a narrowing of the slot.

Figure 6:
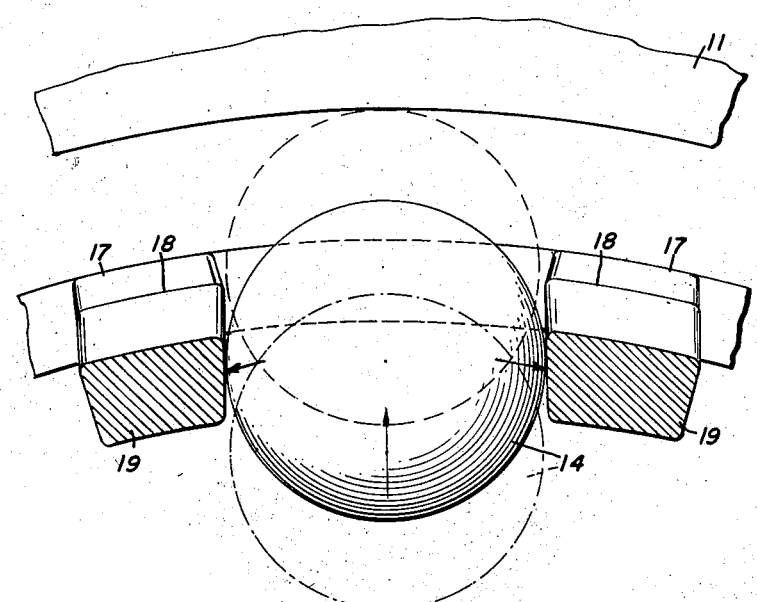
Fig. 6 is a similar view showing the manner of roller assembly to cage.

The mode of assembly or removal of the rollers 14 is illustrated in Fig. 6. If the roller is to be inserted, pressure of the roller will serve to spread the depressed centers 19 of bars 17 sufficiently to permit the roller to pass between the nearer edges of the portion 19, 19. This is accomplished due to the resilience of the material of which the cage is made. As soon as the roller is pushed through the cage and into contact with the outer race 11, the depressed centers 19, 19 spring back into normal position, as shown in Fig. 5. Conversely, in the operation of removing a roller it may be forced inwardly to spread the centers 19, 19.

It will be understood that the novel cage and mode of roller retention is equally well adapted to an inner race where the ends extend radially outward, the relation with the cage being the same as above described.

The advantages of the construction above described, and the mode of operation will be obvious. It will also be understood that numerous changes may be made in minor features of structure, material, and proportions within the scope of the invention as defined in the following claims.

What we claim is:

1. A roller bearing comprising an outer race, a generally cylindrical cage within said race and having a series of parallel resilient bars of uniform and constant cross-section and perpendicular sides, each of said bars having a central portion offset inwardly from the cylindrical surface of the cage and capable of lateral deflection, and a series of rollers resiliently held between said bars.

2. A roller bearing comprising an outer race with inwardly projecting ends, a generally cylindrical cage within said race between said ends and having a series of parallel resilient bars of uniform and constant cross-section and perpendicular sides, each of said bars having a central portion offset inwardly from the cylindrical surface of the cage and capable of lateral deflection, and a series of rollers resiliently held between said bars and the ends of the race.

3. A roller bearing comprising an outer race with inwardly projecting ends, a generally cylindrical cage within said race between said ends and having a series of parallel resilient bars of uniform and constant cross-section and perpendicular sides, axially inwardly extending flanges on the ends of the race within the cage and a series of rollers between the bars of the cage and the end flanges.

4. A roller bearing comprising an outer race with inwardly projecting ends, a generally cylindrical cage within said race between said ends and having a series of parallel resilient bars of uniform and constant cross-section and perpendicular sides, each of said bars having a central portion offset inwardly from the cylindrical surface of the cage and capable of lateral deflection, a series of rollers resiliently held between said bars and the ends of the race, and axial flanges on the ends of the race underlying the ends of the cage.

5. A roller bearing assembly comprising an outer race, a generally cylindrical cage within said race and having end rims and a series of parallel stepped bars of uniform and constant cross-section and perpendicular sides, each of said bars having an intermediate portion inwardly offset from each adjacent rim and a central portion inwardly offset from said intermediate portions and resiliently deflectable therefrom, and a series of rollers held between said bars.

6. A roller bearing assembly comprising an outer race, a generally cylindrical cage within said race, axially inwardly extending flanges on the ends of the race within the ends of the cage, said cage having end rims and a series of stepped parallel bars of uniform and constant cross-section and perpendicular sides, and a series of rollers held between said bars, each of said bars having an intermediate portion inwardly offset from each adjacent rim opposite said flanges and a central resiliently deflectable portion inwardly offset from said intermediate portions.

7. A roller bearing assembly comprising an outer race, a generally cylindrical cage within said race, axially inwardly extending flanges on the ends of the race within the ends of the cage, said cage having end rims and a series of stepped parallel bars of uniform and constant cross-section and perpendicular sides, and a series of rollers held between said bars, each of said bars having an intermediate portion inwardly offset from each adjacent rim opposite said flanges and a central resiliently deflectable portion inwardly offset from said intermediate portions, and lying substantially in the inner path of the rollers.

8. A roller bearing assembly comprising an outer race, a generally cylindrical cage within the race, said cage having end rims and a series of parallel resilient crossbars of uniform and constant cross-section and perpendicular sides, said end rims being substantially tangent to the chord between the axes of adjacent rollers, and each of said bars being offset inwardly at its center.

9. A retainer cage for bearing rollers having a generally cylindrical form with circular ends and a series of integral parallel cross-bars of uniform and constant cross-section and vertical sides spaced apart slightly more than the diameter of the bearing rollers, said bars having inwardly offset central portions spaced apart less than the diameter of the rollers with which the cage is assembled.

10. A retainer cage for bearing rollers having a generally cylindrical form with circular ends and a series of integral parallel cross-bars of uniform and constant cross-section and vertical sides, said bars having intermediate inwardly offset portions spaced apart slightly more than the diameter of the bearing rollers, and inwardly offset central portions spaced apart less than the diameter of the rollers.

11. A retainer cage for bearing rollers having a generally cylindrical form with overlapping circular ends and a series of integral parallel cross-bars of uniform and constant cross-section and vertical sides, said bars having inwardly offset central portions.

References Cited in the file of this patent

UNITED STATES PATENTS

| | | |
|---|---|---|
| 1,444,326 | Buckwalter | Feb. 6, 1923 |
| 1,668,112 | Gibbons | May 1, 1928 |
| 1,733,673 | Rouanet | Oct. 29, 1929 |
| 1,764,198 | Carlson | June 17, 1930 |
| 1,911,544 | Beard | May 30, 1933 |
| 2,038,475 | Brown | Apr. 21, 1936 |
| 2,301,399 | Heim | Nov. 10, 1942 |
| 2,567,242 | Smith | Sept. 11, 1951 |
| 2,591,160 | Kilian | Apr. 1, 1952 |
| 2,721,775 | Nusbaum | Oct. 25, 1955 |
| 2,765,202 | Barr et al. | Oct. 2, 1956 |
| 2,765,203 | Barr et al. | Oct. 2, 1956 |

FOREIGN PATENTS

| | | |
|---|---|---|
| 829,688 | Germany | Mar. 27, 1952 |